United States Patent Office 2,803,661
Patented Aug. 20, 1957

2,803,661

PRODUCTION OF ALKYL HYDROPEROXIDES

Eddie G. Lindstrom, Richmond, Calif., assignor to California Research Corporation, San Francisco, Calif., a corporation of Delaware No Drawing. Application May 25, 1953, Serial No. 357,369

2 Claims. (Cl. 260—610)

This invention relates to an improved method for the production of alkyl hydroperoxides.

Alkyl hydroperoxides have been prepared by the reaction of an alkyl ester of an inorganic oxy acid with hydrogen peroxide in the presence of an alkali metal hydroxide. Baeyer and Villiger described a method for preparing alkyl hydroperoxides by reacting a dialkyl sulfate with hydrogen peroxide in the presence of an alkali metal hydroxide more than fifty years ago (Ber. 33, 3387, 1900; Ber. 34, 738, 1901).

While this method of producing alkyl hydroperoxides has been known to the art for more than fifty years, its use has been characterized by low yields of hydroperoxide product and it has not been possible to extend the method to the production of nontertiary alkyl hydroperoxides containing 4 or more carbon atoms in the alkyl group. For example, it does not appear that normal butyl hydroperoxide or secondary butyl hydroperoxide have ever been prepared by this method, though all the materials for preparation are readily available. The preparation of normal butyl hydroperoxide, secondary butyl hydroperoxide and higher hydroperoxides by this method has been attempted and found unsuccessful. If, for example, di-secondary butyl sulfate is contacted with concentrated aqueous hydroperoxide and potassium hydroxide in the manner of Baeyer and Villiger, no production whatever of the corresponding alkyl hydroperoxide can be detected.

It has now been found that yields of lower alkyl hydroperoxides can be greatly increased and the production of higher alkyl hydroperoxides can be accomplished by contacting a di-alkyl sulfate with aqueous hydrogen peroxide and an alkali metal hydroxide in the presence of methanol.

The improved method of the invention is illustrated by the following examples:

*Example 1*

124 g. of 85% potassium hydroxide (1.88 moles) was dissolved in 400 ml. of methanol and added slowly to 200 ml. of 30% hydrogen peroxide (2.3 moles). The hydrogen peroxide solution was maintained at −10 to −20° C. during the addition. 395 g. (1.88 moles) of chilled secondary butyl sulfate were added slowly during a period of 30 minutes to the KOH—$H_2O_2$ mixture. The temperature was maintained at −10° C. during the addition of the sulfate. The mixture was stirred for 20 hours in an ice bath at 2° C. The reaction mixture was poured into two liters of ice and water and unreacted butyl sulfate was extracted with ether. Three extractions were made employing 200 ml. of ether in each extraction. The hydroperoxide solution was neutralized with 50% sulfuric acid, potassium sulfate being precipitated; 1.5 equivalents were required. 3 pounds of ammonium sulfate were added and the butyl hydroperoxide was extracted with ether. Four extractions were made, employing 200 ml. of ether in each extraction. The ether extract contained 0.45 equivalents of secondary butyl hydroperoxide. The residual water-methanol solution contained 1.14 equivalents of hydrogen peroxide; in other experiments the amount of unreacted hydrogen peroxide was less. Most of the ether was distilled at atmospheric pressure from the ether extract. 200 ml. of water were added to the hydroperoxide concentrate, forming two phases, and the mixture was distilled in a spinning band column at 20:1 reflux ratio and 35 mm. pressure. Secondary butyl hydroperoxide was collected as an azeotrope containing about 50 volume percent water at 30 to 31° C. The azeotropic mixture was saturated with ammonium sulfate, and the hydroperoxide layer was dried with anhydrous copper sulfate. The secondary butyl hydroperoxide had a density 20/4 of 0.9094, a refractive index $n_{20}^D$ of 1.4052, and an equivalent weight determined by reaction with potassium iodide of 50. Combustion analysis: Calculated for $C_4H_{10}O_2$: C, 53.31; H, 11.19. Found: C, 52.13, 52.39; H, 11.26, 10.92.

*Example 2*

164 g. of di-normal butyl sulfate, 51.5 g. of 85% KOH, 170 ml. of methanol and 83 ml. of 30% hydrogen peroxide were reacted following the procedure identical with that in Example 1. The product was worked up by ether extraction and addition of water as in Example 1. The ether-water-hydroperoxide mixture was steam distilled in a "zigzag" column at 32.5 mm. pressure, using a 9:1 reflux ratio. A water butyl hydroperoxide azeotrope containing 50% by volume of water was recovered overhead at 28–29° C. The equivalent weight as determined by reaction with potassium iodide was 50.8. The density 20/4 was 0.9078, and the refractive index was 1.4032. The normal butyl hydroperoxide product evaporated without decomposition on a steam plate and was not detonated by hammer blows.

Alkyl hydroperoxides containing 1 to 12 carbon atoms can be advantageously produced following the procedure described in Examples 1 and 2. Ethyl hydroperoxide and propyl hydroperoxides which had previously been produced by reaction of the corresponding dialkyl sulfates with hydrogen peroxide in the presence of an alkali metal hydroxide are produced in greater yields when methanol is employed. Higher alkyl hydroperoxides including non-tertiary alkyl hydroperoxides containing 4 to 12 carbon atoms are produced in good yield pursuant to the invention, and are not produced at all when methanol is omitted from the reaction mixture.

In general, any alkyl ester of an inorganic oxygen-containing acid can be employed to supply the alkyl group to the alkyl hydroperoxide product pursuant to the invention. The dialkyl sulfates are the preferred esters. In the dialkyl sulfates, the alkyl groups may be the same or different, i. e., dibutyl sulfate may be employed, or a mixed dialkyl sulfate such as ethyl-octyl-sulfate may be employed. Alkyl phosphates, alkyl borates and alkyl sulfonates may be used instead of the dialkyl sulfates. The alkyl groups of the esters contain 1 to 12 carbon atoms. Larger alkyl groups are thought to be operative, but the esters are more difficult to obtain and losses of product to side reactions appear to increase with lengthening of the alkyl chain.

The hydrogen peroxide is desirably employed in concentrated aqueous solution. Ordinarily, the concentration should be in the range from 10 to 90% by weight. At concentrations below 10% by weight the rate of reaction is reduced, and concentrations above 90% by weight should be avoided because of the explosive hazard of the reagent. The presence of minor amounts of hydrocarbon impurities, especially olefinic impurities in the reaction mixture, must be carefully avoided if very highly concentrated hydrogen peroxide is employed.

Any alkali metal hydroxide can be employed in the reaction mixture; sodium and potassium hydroxides being more readily available are preferred. Other strong bases such as barium hydroxide may also be employed. The concentration of the hydroxide has a small effect on the yield at low temperatures. However, when operating at temperatures higher than about 10° C., it is preferable to add the hydroxide in methanol to the alkylating agent and the hydrogen peroxide in methanol-water reaction media at a rate determined by the rate of alkylation and removal of hydroxide. In this manner a high concentration of hydroxide is avoided.

As indicated above, methanol increases the yields of the lower alkyl hydroperoxides which have previously been prepared by the reaction of a dialkyl sulfate, for example, with hydrogen peroxide, and makes possible the production of higher alkyl hydroperoxides by the reaction of these materials where no production of higher alkyl hydroperoxides whatever would be realized in its absence. Several other materials function similarly to methanol in facilitating or making possible these reactions. In general, these materials are polar organic compounds which are either miscible with water in all proportions or have both a high solubility in water and a high capacity to dissolve water. These materials include ethanol, normal propanol, isopropanol, ethylene glycol, diethylene glycol, Cellosolve, acetone, and methylethylketone. Methanol or equivalent materials is added to the reaction mixture in quantities amounting to 0.25 to 20 volumes per volume of water present in the reaction mixture. Preferably the only water introduced is that contained in the hydrogen peroxide.

The temperature at which the reaction is conducted varies somewhat depending upon the particular alkyl esters employed. In all cases the reaction is desirably conducted at temperatures below about 100° C. to avoid possible spontaneous decomposition of the reactants or the reaction product. Preferably, the reaction is conducted at temperatures ranging from about −20° C. to 50° C., the lower temperatures being employed when the reaction is conducted to produce lower alkyl hydroperoxides such as methyl and ethyl hydroperoxide.

I claim:

1. A process for producing non-tertiary alkyl hydroperoxides containing 4 to 12 carbon atoms in the alkyl group which comprises contacting a non-tertiary dialkyl sulfate having 4 to 12 carbon atoms in each alkyl group with hydrogen peroxide and an alkali metal hydroxide in the presence of methanol.

2. A process for producing non-tertiary alkyl hydroperoxides having 4 to 12 carbon atoms in the alkyl group which comprises contacting a non-tertiary dialkyl sulfate having 4 to 12 carbon atoms in each alkyl group with hydrogen peroxide and an alkali metal hydroxide in the presence of aqueous methanol containing 0.25 to 20 volumes of methanol per volume of water.

References Cited in the file of this patent
UNITED STATES PATENTS 2,369,096   Wiley _____ Feb. 6, 1945

OTHER REFERENCES

Medwedew et al.: Ber. Deut. Chem., vol. 65 (1932), pp. 133–137 (5 pp.).